No. 658,894. Patented Oct. 2, 1900.
T. D. GORDON.
BLANKET.
(Application filed Feb. 1, 1900.)
(No Model.)

Witnesses
P. R. Richards.
H. E. Lowry.

Inventor
Thomas D. Gordon
By H. M. Richards and
Raymond & Amohundro
Attys

UNITED STATES PATENT OFFICE.

THOMAS D. GORDON, OF MONMOUTH, ILLINOIS.

BLANKET.

SPECIFICATION forming part of Letters Patent No. 658,894, dated October 2, 1900.

Application filed February 1, 1900. Serial No. 3,612. (No model.)

*To all whom it may concern:*

Be it known that I, THOMAS D. GORDON, a citizen of the United States, residing at Monmouth, in the county of Warren and State of Illinois, have invented certain new and useful Improvements in Horse-Blankets, of which the following is a specification.

My invention relates to certain new and useful improvements in horse-blankets; and one object is to arrange the fastening-straps on the blanket in such a way that they will not tear the blanket, wear the mane of a horse, or become loosened, so that the blanket can slip off of the horse.

A further object of the invention is to provide a simple arrangement of the fastening-straps for a horse-blanket which act independently of each other and do not prevent the horse from moving freely, while at the same time securing the blanket in its proper position; and further objects of the invention are to secure a blanket on a horse in such a manner that it will be held in place regardless of any rolling, rubbing, or moving of the horse, to arrange the forward fastening-strap so that it will pull bias of the cloth, and thereby avoid tearing the blanket over the horse's shoulder, to secure the fastening-straps to the under side of the blanket, and to avoid tearing the blanket where the straps pass through the openings therein.

With these and other ends in view the invention consists in the peculiar arrangement of parts hereinafter described in detail in connection with the accompanying drawings, in which—

Figure 1:
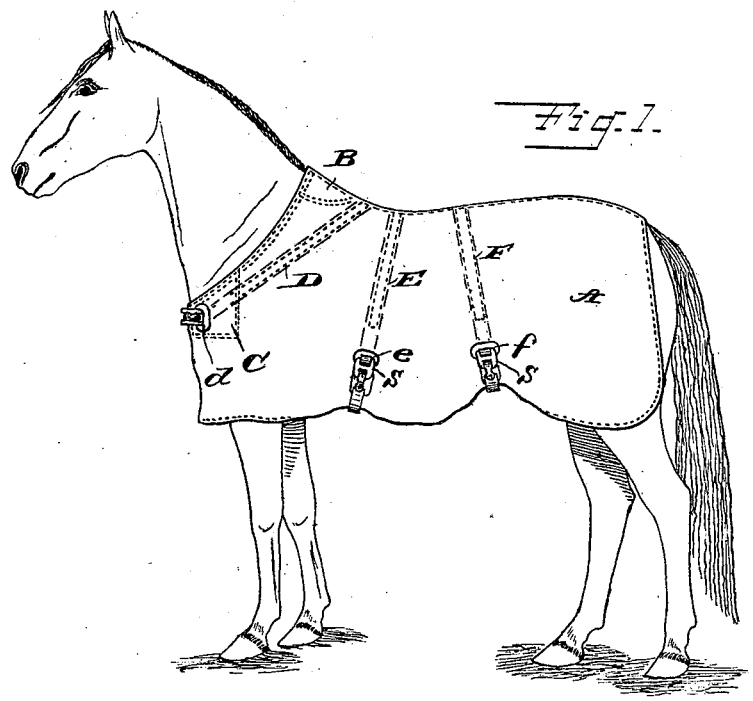
Figure 2:
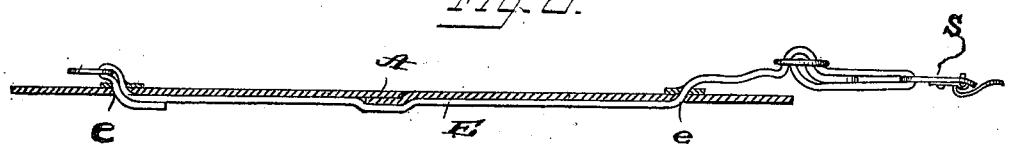
Figure 3:
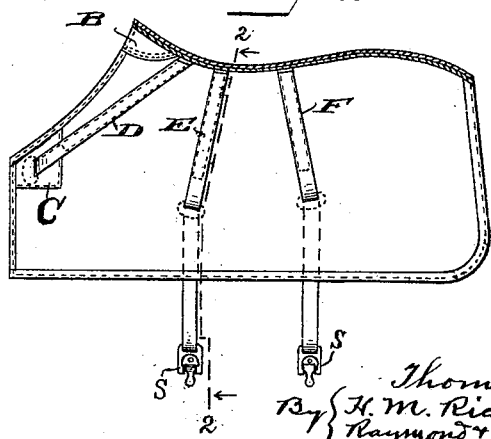

Figure 1 illustrates my improved blanket applied to a horse. Fig. 2 is a sectional view on the line 2 2 of Fig. 3. Fig. 3 is a central sectional view showing the inner side of one-half of the blanket.

Referring to the drawings, in which like letters of reference denote corresponding parts in all of the figures, A designates the blanket, which may be of any suitable material and of any desired size and shape, and it is provided with a reinforce-piece B at its upper front edge where it goes over the horse's neck and other reinforce-pieces C at the front thereof, these reinforces being located at the points where the greatest strain is applied to the blanket.

The blanket is secured in place on a horse by means of fastening-straps D E F, three of which I have found desirable and have shown same in the drawings. These straps are all fastened by stitching or otherwise to the under side of the blanket in or about the positions indicated in the drawings, and the lower ends of these straps pass through openings $d$ $e$ $f$ in the blanket and hang down on the outer side thereof, the holes being located slightly above the lower edges of the blanket, so that when the ends of the strap are connected by the buckles S the edges of the blanket will be bound close to the horse's body. The stitching which fastens the straps to the blanket ends at a short distance above the holes through which the straps pass, so that the straps will not be connected with the blanket for a short distance above the holes. By this means provision is made for allowing the blanket to slip up slightly on the straps without tearing when the horse rolls or rubs the blanket against a wall or floor or otherwise pulls on the blanket, a certain freedom of movement for the lower part of the blanket while the blanket is held rigidly in place on the horse being of special importance. The forward strap D extends from the upper part of the front of the blanket which covers the horse's breast and backward away from the curved neck part of the blanket to an upper point behind the withers of the horse, so that the forward strain on this strap at its lower part will pull straight on the strap, but bias of the cloth, and thereby avoid tearing the blanket over the horse's shoulder and at the same time prevent the strap from wearing the horse's mane. The other two straps E and F are suitably located, so as to dispose the fastening-straps in a manner which will secure the best results.

My improved horse-blanket is constructed in a very simple manner; but the improvements and advantages derived from the peculiar arrangement of parts are many and important, and particularly so in view of the use to which a blanket of this kind is put. It is obvious that any means which will permit freedom of movement of the horse in the blanket without in any way disarranging the blanket or tearing or otherwise injuring the same is a matter of considerable importance, and by the simple means which I have employed I am able to provide a blanket possessing such advantages. By sewing the straps to the under side of the blanket they are made to all intents and purposes an integral part thereof, and whatever strain may be put upon these straps will be distributed throughout the area of the blanket or at least the greater portion thereof. Besides, the straps are so connected with the blanket that they will not wear the mane or hair of the horse, and the forward strap D is located in a peculiar manner, so that the strain exerted thereon will not tend to tear the blanket or interfere with the free action of the horse's head. By terminating the stitching above the openings, through which the ends of the straps pass, I provide a blanket which will remain at all times in proper position over the horse's back, while the lower ends thereof may be rubbed upon the straps without in any way injuring the blanket. This occurs in the ordinary movements of the horse and at times when he is rubbing himself or rolling; but by the arrangement I have described the blanket will remain in its correct position on the horse notwithstanding any movements which he may make.

Having thus fully described my invention, what I claim, and desire to secure by Letters Patent, is—

1. A horse-blanket provided with means for fastening same to the animal, consisting of straps fastened to the under side of the blanket and having their ends passing through openings located away from the edges of the blanket, substantially as described.

2. A horse-blanket provided with means for fastening same to the animal, consisting of straps fastened to the under side of the blanket by stitching, the lower ends of the straps passing through openings in the blanket located away from the edges thereof and the stitching which fastens the straps to the blanket terminating at a distance from the holes, substantially as described.

3. A horse-blanket provided with a fastening-strap D fastened to the under side of the blanket and extending from the front thereof backward away from the front upper edge of the blanket to a point approximately behind that part of the blanket which covers the horse's withers, the ends of said strap D passing through openings located away from the front edges of the blanket substantially as described.

4. A horse-blanket provided with means for fastening same to an animal, consisting of straps stitched to the under side of the blanket for the greater portion of their length and having their ends, some distance below where the stitching stops, passing through openings in the blanket at a distance away from the edges thereof, the forward neck-strap having its upper portion located at a distance behind the forward upper edge of the blanket, substantially as and for the purpose described.

THOMAS D. GORDON.

Witnesses:
W. S. JOHNSON,
F. N. GAY.